United States Patent
Lauber

(10) Patent No.: US 12,093,648 B2
(45) Date of Patent: Sep. 17, 2024

(54) SYSTEMS AND METHODS FOR PRODUCING A SEMANTIC REPRESENTATION OF A DOCUMENT

(71) Applicant: Nice Ltd., Ra'anana (IL)

(72) Inventor: Stephen Lauber, Modi'in (IL)

(73) Assignee: Nice Ltd., Ra'anana (IL)

( * ) Notice: Subject to any disclaimer, the term of this patent is extended or adjusted under 35 U.S.C. 154(b) by 41 days.

(21) Appl. No.: 17/178,754

(22) Filed: Feb. 18, 2021

(65) Prior Publication Data
US 2022/0261545 A1   Aug. 18, 2022

(51) Int. Cl.
G06F 40/289 (2020.01)
G06F 16/35 (2019.01)
G06F 40/30 (2020.01)

(52) U.S. Cl.
CPC .......... *G06F 40/289* (2020.01); *G06F 16/355* (2019.01); *G06F 40/30* (2020.01)

(58) Field of Classification Search
CPC ....... G06F 40/289; G06F 16/355; G06F 40/30
See application file for complete search history.

(56) References Cited

U.S. PATENT DOCUMENTS

| | | | |
|---|---|---|---|
| 7,272,594 B1 * | 9/2007 | Lynch | G06F 40/194 |
| 10,459,999 B1 * | 10/2019 | O'Hara | G06F 40/216 |
| 11,423,236 B2 * | 8/2022 | Walters | G06F 40/284 |
| 2003/0154181 A1 * | 8/2003 | Liu | G06F 16/355 |
| 2003/0217335 A1 * | 11/2003 | Chung | G06F 40/30 |
| | | | 707/E17.084 |
| 2006/0026152 A1 | 2/2006 | Zeng et al. | |
| 2010/0094840 A1 * | 4/2010 | Donnelly | G06Q 30/02 |
| | | | 707/E17.061 |
| 2010/0185689 A1 * | 7/2010 | Hu | G06F 40/30 |
| | | | 707/E17.108 |
| 2011/0225159 A1 * | 9/2011 | Murray | G06F 16/358 |
| | | | 707/739 |
| 2011/0258229 A1 * | 10/2011 | Ni | G06F 16/36 |
| | | | 704/8 |
| 2016/0042053 A1 | 2/2016 | De Sousa Webber | |

(Continued)

OTHER PUBLICATIONS

Quoc et al., "Distributed Representations of Sentences and Documents.", 2014., arXiv preprint arXiv:1405.4053v2.

(Continued)

*Primary Examiner* — Michael N Opsasnick
(74) *Attorney, Agent, or Firm* — PEARL COHEN ZEDEK LATZER BARATZ LLP

(57) ABSTRACT

A system and method for determining an embedding for a document (e.g. representing the document in vector space) by determining for the document a preliminary document embedding; determining for the document a document topic embedding based on a set of nearest topics to the preliminary document embedding; determining for each phrase in the document a topic relevancy score based on the document topic embedding and the embedding associated with the phrase; using a ranking algorithm to determine a saliency score for each phrase in the document, each saliency score based on the topic relevancy score for the phrase, and an inverse frequency score for the phrase; and calculating an embedding for the document using the saliency scores and embedding, for the phrases in the document.

31 Claims, 3 Drawing Sheets

(56) References Cited

U.S. PATENT DOCUMENTS

| | | | | |
|---|---|---|---|---|
| 2016/0365093 | A1* | 12/2016 | Nissan | G10L 15/183 |
| 2017/0076151 | A1* | 3/2017 | Roy | G06F 40/289 |
| 2018/0060437 | A1* | 3/2018 | Gao | G06F 16/951 |
| 2018/0189307 | A1 | 7/2018 | Yu et al. | |
| 2018/0308487 | A1 | 10/2018 | Goel et al. | |
| 2019/0155944 | A1* | 5/2019 | Mahata | G06F 16/345 |
| 2020/0110801 | A1* | 4/2020 | Zheng | G06N 3/045 |
| 2020/0167391 | A1* | 5/2020 | Zheng | G06F 16/3347 |
| 2021/0042391 | A1* | 2/2021 | Gehrmann | G06N 3/048 |

OTHER PUBLICATIONS

Levy et al., "Dependency-Based Word Embeddings.", Proceedings of the 52nd Annual Meeting of the Association for Computational Linguistics (vol. 2: Short Papers)., 2014.

Kusner et al., "From Word Embeddings To Document Distances.", Proceedings of the 32nd International Conference on Machine Learning., 2015., vol. 37, JMLR W&CP, Lille, France.

Kiros et al., "Skip-Thought Vectors.", 2015., arXiv preprint arXiv:1506.06726v1.

Hill et al., "Learning Distributed Representations of Sentences from Unlabelled Data.", 2016., arXiv preprint arXiv:1602.03483v1.

Arora et al., "A Simple but Tough-to-Beat Baseline for Sentence Embeddings.", Conference Paper at ICLR, 2017.

Chen, Minmin., "Efficient Vector Representation for Documents Through Corruption.", 2017., arXiv preprint arXiv:1707.02377v1.

Pagliardini et al., "Unsupervised Learning of Sentence Embeddings using Compositional n-Gram Features.", 2018., arXiv preprint arXiv:1703.02507v3.

Logeswaran et al., "An Efficient Framework for Learning Sentence Representations.", 2018., arXiv preprint arXiv:1803.02893v1.

* cited by examiner

SYSTEMS AND METHODS FOR PRODUCING A SEMANTIC REPRESENTATION OF A DOCUMENT

FIELD OF THE INVENTION

The present invention relates generally to semantic representation of documents and transcripts, and specifically producing such representations from semantic representations of component parts such as phrases.

BACKGROUND OF THE INVENTION

Textual analysis technology may rely on document embeddings, providing a semantic representation of a document, for functions such as summaries, grouping of documents, highlighting, or topic analysis of documents. Documents may include for example published documents or papers, transcripts of conversations or calls between customer service agents and customers, or other text documents.

An embedding may represent a word, phrase, multi-word phrase, sentence, string, document or some other unit of text as vectors, embedded in a vector space. Natural language processing (NLP) may represent or map these units of text as embeddings, often represented as vectors (e.g. ordered lists of values or continuous numbers) or distributed vectors. Such a vector may be a semantic measure, or a measure the linguistic context, of the word(s) associated with the vector. The similarity, e.g. cosine similarity, or distance, e.g. Euclidian distance, between two vectors may measure the amount of semantic or meaning similarity between the words or groups of words associated with each vector. Cosine similarity may be a measure of the similarity between two vectors, and by extension of the entities (e.g. words, phrases) which are represented by those vectors: for example for vectors v1 and v2, the cosine similarity cosine-sim=$(1-/|v1|c|v2|)$. Vectors representing words or phrases are such that a simple mathematical function (e.g. cosine similarity) may indicate the level of semantic similarity between the words or phrases represented by those vectors.

Vectors can be created from words or strings or groups of words using algorithms such as the word2vec word embedding creation algorithm, or another suitable process, which may output an embedding or vector, typically of several hundred values or dimensions (e.g. 200 values or dimensions), with each unique word or string being assigned a corresponding vector. An embedding vector for a string of text may be created by inputting the string into a machine learning (ML) algorithm such as a specialized neural network (NN) which may be trained, typically in an unsupervised manner, and learn word associations from a large corpus of text. In such NNs, the input layer and output layer may be identical, and an internal layer may provide the embedding. The semantic representation of a text document as a document embedding may be based on its components' embeddings. The question then becomes how to combine these into a single embedding which will represent the document as a whole. The possible reasons for doing this include the ability to group together documents such as calls which are semantically similar (e.g. using clustering), or searching for calls which are similar to a some query or indeed, to a specified call.

SUMMARY OF THE INVENTION

Embodiments of the invention may create an embedding for a document from the embeddings of its component phrases, based on structured phrase embeddings. A system and method for determining an embedding for a document (e.g. representing the document in vector space) by determining for the document a preliminary document embedding; determining for the document a document topic embedding based on a set of nearest topics to the preliminary document embedding; determining for each phrase in the document a topic relevancy score based on the document topic embedding and the embedding associated with the phrase; using a ranking algorithm to determine a saliency score for each phrase in the document, each saliency score based on the topic relevancy score for the phrase, and an inverse frequency score for the phrase; and calculating an embedding for the document using the saliency scores and embeddings for the phrases in the document.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
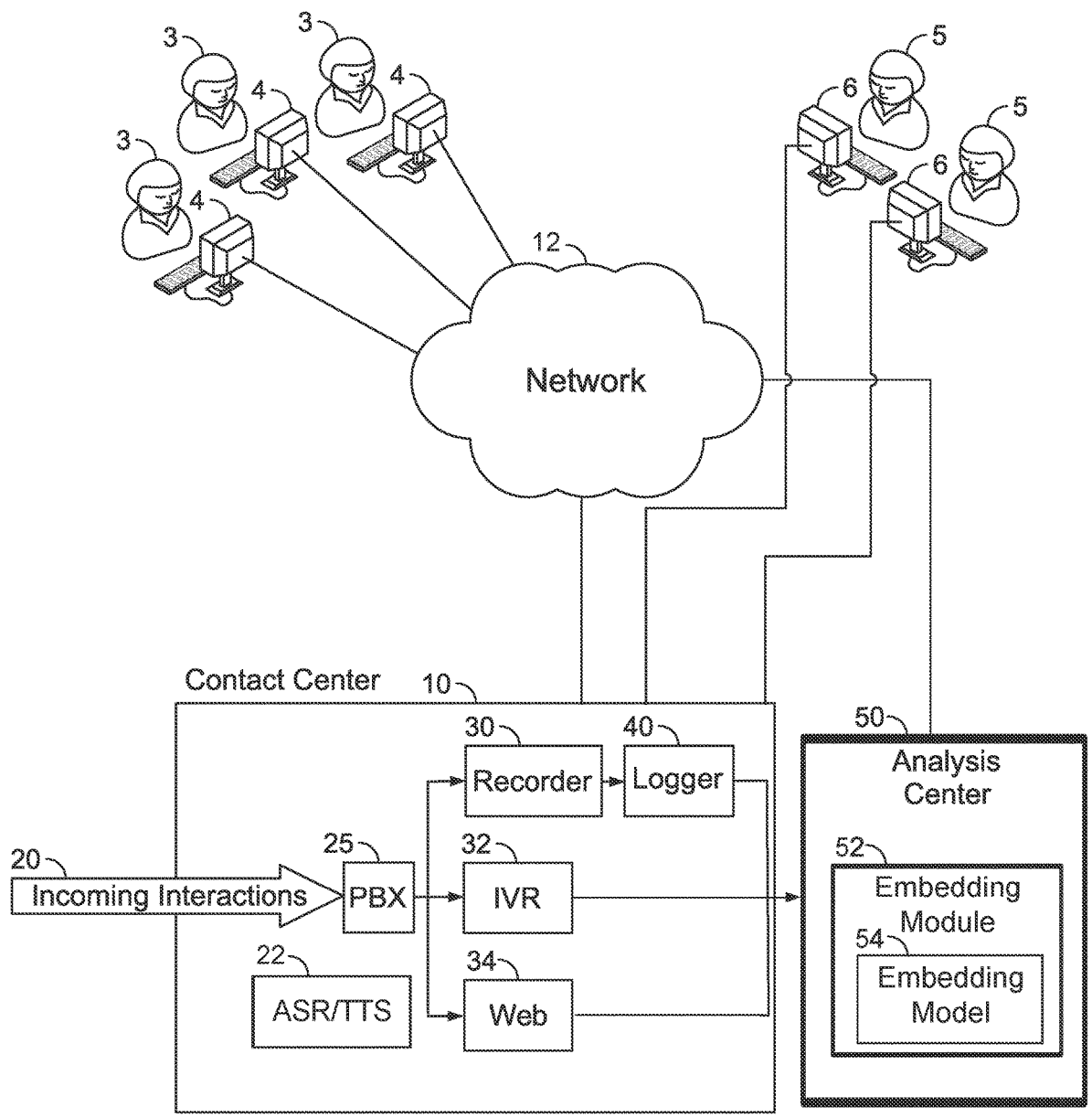
FIG. 1 is a block diagram of a system for creating and using structured phrase embeddings according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may determine an embedding (e.g. a numerical representation of the semantic content, such as a vector) for a document such as a call transcript or another text document. The embedding may be for a "newly seen" document, as a corpus of documents may be processed to create data, such as phrase embeddings and topics, to be used to determine the embedding of the new document: the new document may not be in the previously analyzed corpus. A preliminary or a-priori document embedding may be created for the document based on embeddings associated with each phrase in the document: prior to this the document may be processed to convert the document to phrases or structured phrases. A document topic embedding may be determined for the document based on a set of topics nearest to the preliminary document embedding. For each phrase in the document, a topic relevancy score may be determined based on the document topic embedding of the nearest topic and the embedding associated with the phrase, e.g. by calculating a distance between the document topic embedding and the phrase embedding graph-based ranking algorithm may be used to determine a saliency or importance score for each phrase in the document, each saliency score based in part on the topic relevancy score for the phrase, and an inverse frequency score for the phrase. The document embedding may then be calculated using the saliency scores and embeddings for the phrases in the document.

In order to create phrase embeddings for use with embodiments of the invention, embodiments may create, from input data (e.g. a large number of documents such as transcripts of interactions, which may be conversations), structured input samples which may be provided to algorithms to produce phrase embeddings (e.g. vectors) for the input data. A structured call or document may be the original or raw text call transcript or document converted to a series of structured phrases. A large corpus of documents or call transcripts, for example 200,000 calls, may be used.

Embodiments may use algorithms to rank or score the saliency of individual units of text with respect to the document or call in which they appear: e.g. general-purpose graph-based ranking algorithm for NLP, such as the known TextRank algorithm (which in turn is based on Google's PageRank algorithm) may be used to rank the relevance of component units (e.g. a sentence) for, e.g. extractive text summarization. Such algorithms may give scores to each unit of text which represent how salient it is in the context of the document in which it is contained; the higher the score the more salient the document. Such algorithms may work by transforming an input text or document into a graph structure, where each node represents an individual unit of text, and using a process of mutual reinforcement, during which each node casts 'votes' for other nodes similar to it, the process eventually converging to a stable state with each node having received a saliency score. The metric used to measure the similarity between units or sentences to be used in the algorithm can be for example lexical measuring the number or ratio of overlapping words) or semantic, using sentence or other embeddings.

In a graph-based ranking algorithm such as TextRank, a graph may be created, each node corresponding to a phrase, where links in graph represent or are associated with similarity scores, all the links initially being set to the same value but being augmented or increased by a personalization or bias score. Each node may "vote" on how similar it is to each other node (typically using a measure of distance between the embeddings of the phases attached to the nodes, such as cosine distance) and if two nodes are similar according to a measure or threshold in an iteration they each may share its weight with the other node by sending a portion of its weight to the other node. The algorithm eventually converges over iterations, with nodes having little similarity to other nodes not having gained as much weight as nodes having similarity with many other nodes. The saliency is taken from each nodes weights after a series of iterations results in convergence.

Embodiments may use a graph-ranking algorithm such as TextRank which is 'personalized', for example by having scores for phrases represented by nodes augmented by SW ('smoothed inverse frequency') scores and topic relevancies as initial biases. Such frequency scores are typically relative to the corpus being processed. For example, in addition to the 'votes' received from similar nodes, a node's saliency score has an additional component which can be seen as kind of prior or bias in the sense that a node with a high 'personalization' is seen as important a-priori, regardless of how similar it is to other nodes. The bias may be input to the weighting used in the ranking algorithm. A weighting between the components, namely the regular TextRank score and the personalization component, for the purpose of obtaining the node's final saliency score, may be configurable, for example a split of 85% regular/voting and 15% personalization/a-priori. Embodiments may use a ranking process such as a personalized TextRank algorithm to score the importance of a sentence and thereby identify the most salient ones to be used for the purpose of extractive text summarization. Embodiments may use enhanced graph-based ranking algorithms by for example ranking phrases, structured-phrases or embeddings of structured phrases to represent the nodes in the graph rather than the traditional sentences; and 'personalizing' the algorithm (e.g. giving certain phrase nodes an a-priori bias) e.g. based on their inverse frequency (e.g. SIF) and 'topic relevancy'. The a-priory basis in some embodiments may be a mathematical combination of the topic relevancy and SW score for a phrase, e.g. a personalization weight.

While a SIF score is discussed herein, other inverse frequency measures may be used. A SIF score may discount the significance or weight based on the frequency with which it occurs in a corpus, the assumption being that rarer words have more 'information content'. An example formula for producing a SIF score for a token having frequency of token_freq is:

$$SIF=a/(a + token\_freq) \text{ for some value of constant } a, \text{ typically } 0.001$$

After the ranking algorithm has converged and returns the scores for each phrase, these scores may be used to calculate the weighted average of the phrases (e.g. weighted by the personalized graph-based ranking score), or of the top-n phrases to create a final document or call embedding. Embodiments of the present invention may create for an input document a sequence of phrase embeddings through such a personalized TextRank or other algorithm, and then to use the scores for each phrase thereby obtained (which typically represents a saliency) as the respective weights for calculating a linear combination of their embeddings. This linear combination may be used to create a document embedding, where each phrase of the document contributes according to its saliency.

In one embodiment, an a priori or personalization score is itself based on two components: an inverse frequency score such as a SW score; and a topic relevancy score. A topic relevancy score for one of several topics associated with a document may be created from clusters. For example, once a phrase embedding model for a corpus has been trained, a clustering or grouping algorithm such as the K-Means algorithm or other algorithms can be used to cluster the embedding, of the phrases in a model (e.g. a system producing embeddings such as a table or a neural-network based model) into semantic topics. Clustering may include unsupervised machine learning techniques for grouping similar items (e.g. phrases, words, etc.) by some predefined distance metric. Typically the objects to be clustered are described mathematically, e.g. using an embedding vector, to allow the clustering algorithm to operate. For example, phrases such as 'pay bill','past due', 'outstanding balance' etc. may be grouped together in a cluster, and, similarly, 'slow internet', 'bad wifi connection', 'restart modem' etc. may be grouped into another cluster. Topics may in a sense be formed by or defined by the clusters created. Topic embedding, (e.g. vectors) can then be calculated for each resulting topic cluster (e.g. for each topic corresponding to a cluster) as the weighted combination (e.g. weighted by phrase inverse frequency or SIF) of the embeddings of the member phrases of the cluster. Typically, these topic embeddings need only be calculated once, and may subsequently remain constant.

For a document or call, a preliminary document embedding may be calculated as the weighted average of its phrase embedding sequence (e.g., the ordered sequence of each phrase converted from sentences or phrases appearing in the document, as the text corresponding to the phrase appears in the document), using a combination of weighting (e.g. SIF score) and its position or index in the sequence to give the respective weights of each phrase. E.g. a weight of a phrase may be a combination of SIF score and position of the phrase. The assumption may be that the important issues such as the caller's main complaint or subject of inquiry will come early in the conversation. Using this preliminary document embedding, a process may determine or find the K-nearest (e.g. K being a preset integer and nearest being defined by a mathematical distance function such as cosine distance) or most similar topics to the document (e.g. weighted by their similarity scores) by calculating, for example, the cosine-similarity (or another distance or similarity measure) between the preliminary document embedding and the topic embeddings. From this a set of nearest, e.g. the K-nearest (e.g. the three or five nearest, or K topics closer than a certain threshold) topics, or the topics having similarity ratings above a threshold, may be determined.

For example, a preliminary document embedding may be calculated using example Equations 1A and 1B:

$$Wx=a*SIP+(1-a)*(1/\log(\text{line\_num}))$$  Eq. 1A $$\text{Preliminary embedding}=E_1*W_1+E_2*W_2+_3+\ldots+E_N*W_N$$  Eq. 1B Where Wx is the weight for phrase (weight being a function of line number and SIF score; other specific functions may be used); a is a configurable parameter; line_num is the ordered position in the document of the phrase; SW is a measure of inverse occurrence of the phrase; Preliminary embedding is the preliminary embedding for a document containing phrases 1–N; Ex is the embedding for phrase 1, and Wx is the weight within the specific document of phrase X. Line_num gives more weight to phrases appearing earlier in the text or call. The expression $a*X+(1-a)*Y$ allows for taking a weighted combination of two components X and Y. For example setting 'a' to 0.75 would give $0.75X+0.25Y$, thereby giving X 3 times the weight given to Y. The line number may indicate where the phrase is in a call or document, e.g. the number (in an ordered sequence) of the turn containing the phrase; or the number of the phrase or line or sentence containing the phrase within the document.

For each document, the weighted average of the topic embeddings of the set of nearest of K-nearest topics (e.g. weighted by their distances, similarities or cosine similarities to the preliminary embedding for the document) may be calculated to produce a "combined topic embedding" for the document. The combined topic embedding for the document, (e.g., the weighted average of the K-nearest topics for the document) may be used to calculate a "topic relevancy" score for each phrase in that document. In one embodiment the topic relevancy score for a phrase in a document is the cosine similarity score (or other distance measure) to the topic embedding for the topic including that phrase. Such a topic relevancy may indicate how similar the phrase is to the main topics of the document or call, and therefore indicates its topic relevancy with respect to the document or call.

A topic relevancy score for a phrase, combined with the phrase's SIF or other inverse frequency score, may be used to calculate the a-priori or personalization score for the phrase, which can then be passed as input, together with the phrase embeddings, into for example a personalized TextRank algorithm, to obtain the final saliency scores for each phrase.

Based on these operations, the saliency scores of each phrase may have for example its SIF score, position, topic relevancy, and its similarity to other phrases baked into or included in it, and the saliency score may therefore be an appropriate and accurate weighting to be used for calculating the final call embedding reflecting a that weighted average of phrase embeddings.

In some embodiments, in addition, the principal component vector may be subtracted from each of the phrase embeddings which may produce a calculation of the final document or call embedding. Given a set of vectors such as phrase embeddings of a document, a process may transform the phrase embeddings onto a new set of coordinates, for example having the same dimensionality as the original embedding space, using principal component analysis. The principal component of the new coordinate system may then be removed from each (e.g. transformed) phrase embedding.

Prior art documents may provide less accurate measures of document embeddings. For example, one prior art method may use a simple sum, average, or weighted average. The Sent2Vec algorithm may use the standard word2vec method, including n-grams and use each sentence as the context window. Embodiments of the present invention may improve on these methods, for example by using of TextRank or other phrase ranking scores as weights for combining text units (e.g. structured phrases) into a single document embedding; and by using topic cluster embeddings (for example derived, in turn, from a novel phrase embedding model) for the purpose of calculating the personalization scores from the topic relevancies of each phrase, which is used as input to a personalized TextRank algorithm. Such improved document embeddings may be used by NLP technology and intelligent text analytics such as for semantic search at the call level (e.g. search for "technicians arriving late"), search by example (e.g. find calls or documents similar to document X), clustering of calls, etc.

FIG. 1 is a block diagram of a system for creating document embeddings according to an embodiment of the present invention. While FIG. 1 shows such a system in the context of a contact or call center, embodiments of the invention may be used in other contexts. Incoming interactions 20 (e.g. conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32. Internet sessions or web block 34 and voice interactions block or recorder 30. People 3 may operate external user equipment 4 to communicate with agents 5 via contact center 10; and agents 5 may operate agent terminals 6 for that communication and other purposes. Incoming interactions 20 may be pre-processed and may enter the system as text data, or may be converted to text via automatic speech recognition (ASR) or TTS module 22.

Figure 2:
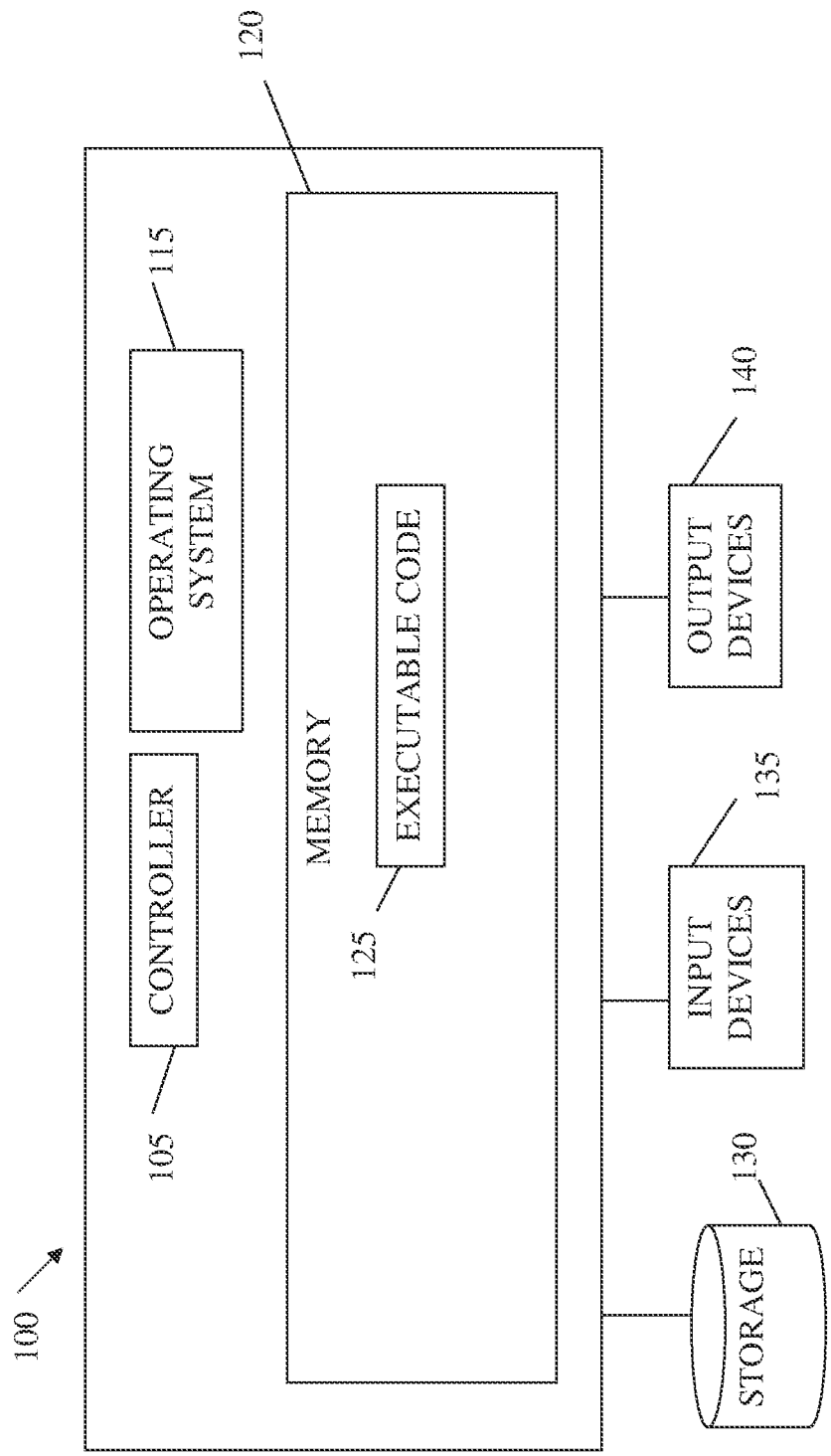
FIG. 2 shows a high-level block diagram of an exemplary computing device which may be used with embodiments of the present invention.

User equipment 4 and agent terminals 6 may include computing or telecommunications devices such as personal computers or other desktop computers, conventional telephones, cellular telephones, portable or tablet computers, smart or dumb terminals, etc., and may include some or all of the components such as a processor shown in FIG. 2.

Interaction data, text or documents, e.g. representing conversations between agents and customers, may be stored, e.g., in files and/or databases. For example logger 40 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10. A corpus of documents or texts may thus be created and stored. In other embodiments or use cases the corpus may be different than customer-agent conversations.

Figure 3:
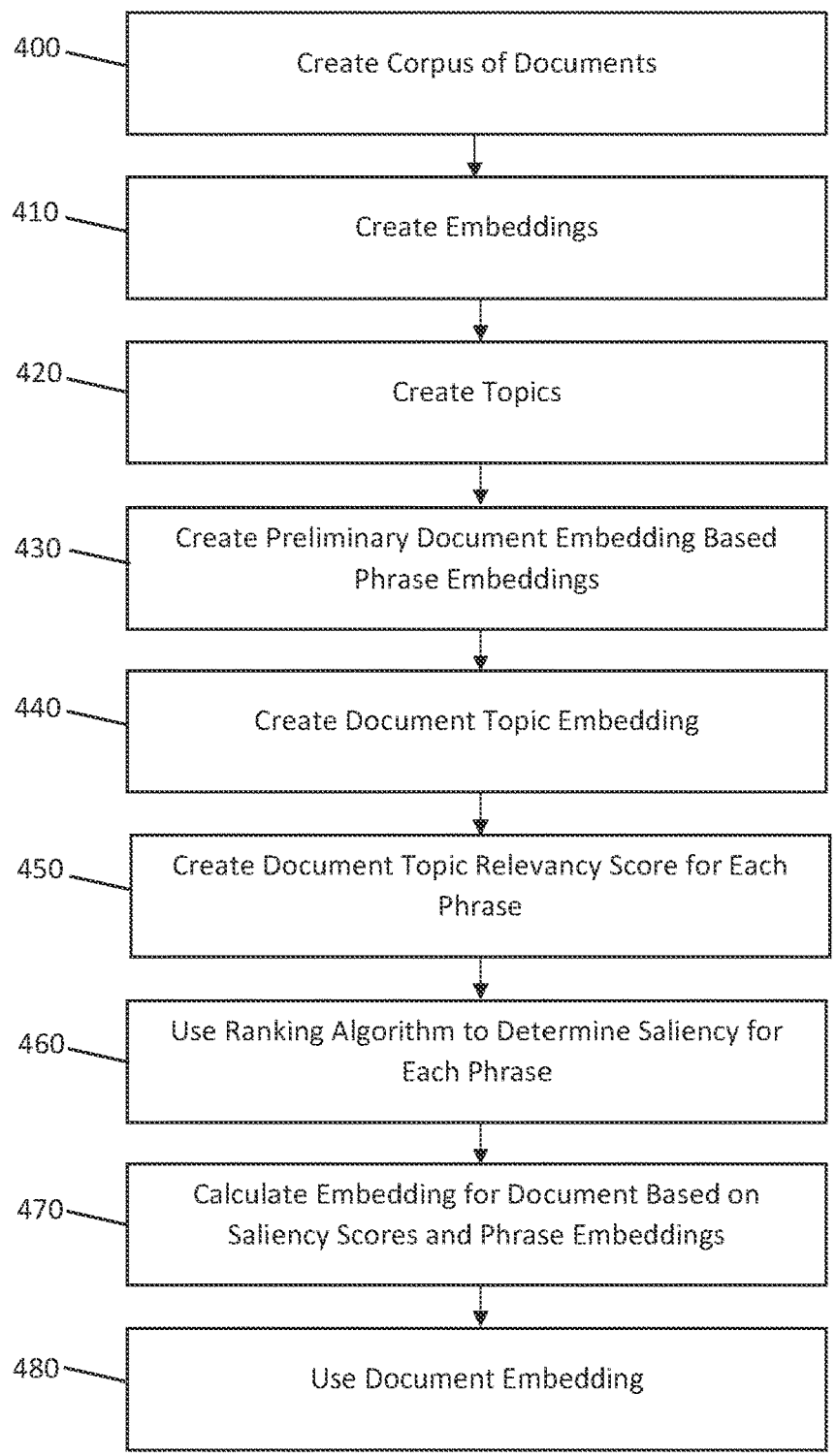
FIG. 3 is a flowchart of a method according to embodiments of the present invention.

Analysis center 50 may perform functions such as those shown in FIG. 3, and may include for example embedding module 52 which may be or may be implemented as a machine learning or neural network algorithm, or by another system. Embedding module 52 may for example create embedding vectors or embedding model 54. Embedding model 54 may be a table including entries for tokens, words, phrases, etc., with associated embeddings created by embedding module 52, and associated weights or frequency scores. Embedding model 54 may be part of embedding module 52, or a separate unit. Analysis center 50 may communicate with for example user terminals to for example provide visualizations or the output of inference or production, conduct searches, etc. Embedding module 52 may be or includes a lookup-table directly mapping phrases, single tokens and/or multi-word terms to their associated embeddings, with keys of lookup table tokens and terms rather than structured phrases.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 1 contact center 10 is shown passing data to analysis center 50, these modules may communicate via a network such as networks 12.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22, PBX 25, IVR block 32, voice interactions block or recorder 30, connect API 34, analysis center 50, embedding module 52, external user equipment 4, and agent terminals 6, and other equipment and modules discussed herein may be or include a computing device such as included in FIG. 2, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as text, graphs, documents interactions, embedding models or data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as embeddings, documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. Any applicable input/output (I/O) devices may be connected to computing device 100, for example, a wired or wireless network interface card (NIC), a modem, printer or facsimile machine, a universal serial bus (USB) device or external hard drive, and may be included in input devices 135 and/or output devices 140.

Embodiments of the invention may include one or more article(s) memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a flowchart of a method according to embodiments of the present invention. Embodiments may be executed by computer systems as described in FIGS. 1 and 2, but other systems may be used.

Operations 400-420 may be performed to process a corpus of documents, calls or interactions to create data such as embeddings that may be used to process documents, or new documents, and operations 430 onward may be performed for each document, or for a newly seen document (e.g. not in the corpus used to generate data), in order to create an embedding for that document.

In operation 400, a corpus of documents may be created—e.g. call or interaction transcripts may be collected or created by converting audio recordings to text via. ASR.

In operation 410, phrase or structured phrase embeddings may be created for the corpus. In one embodiment structured phrase embeddings may be created by, for each document in the corpus, converting the original text to a series of structured phrases and a creating phrase embedding for each phrases, for example using techniques discussed herein. Other processing may be performed, such as creating or dividing documents into turns, as explained elsewhere herein. Along with or at the time of phrase embedding creation, for each phrase, a frequency or inverse frequency measure may be created (e.g. a SIF score) and the embedding and frequency measure may be associated with the phrase, e.g. in a look-up table. Other methods of creating phrase embeddings may be used. A large corpus of documents or call transcripts, for example 200,000 calls, may be used.

In one embodiment, phrase embeddings may be stored in a look-up table using as a key the phrase, possibly along with other information such as a SIF or frequency score; however, other methods of creating and accessing phrase embeddings may be used. Multi-word phrases may be contained in the look up table, and/or have their embeddings created from words in the table. A 'raw' model may include a look-up table already containing the embeddings of multi-word phrases, but the full embedding at inference may in some embodiments continue with a look up of all the relevant sub-terms in the phrase as well, combining all these together to give the final phrase embedding. However, phrase embeddings may be produced and taken from other sources.

In operation 420, topics may be created for the corpus, for example by clustering or grouping the phrases or structured phrases produced for the corpus into clusters, and for each cluster determining an embedding—a topic embedding—which may represent the cluster and a topic. Other methods of creating topics and topic embeddings may be used. A topic embedding TEi for a topic I may be according to the following example equation:

$$TEi = \Sigma sif_j * PE_j \qquad \text{Eq. 2}$$

Where PEi is a phrase embedding i within the topic, and sifi is the SIF score for phrase PEi.

In operation 430, for a particular document, a preliminary or initial document embedding may be created based on embeddings associated with each phrase (e.g. in some cases phrases as created in operation 410) contained in the document. For example, a preliminary document embedding can be calculated as the weighted average of a document's phrase embedding sequence, using or based on a combination of SIF and its position in the sequence, as in example equations Eq. 1A and Eq. 1B herein. Each phrase in the document may be ordered in the sequence that it appears in the document, e.g. first phrase (sequence or index 1), second phrase (sequence or index 2) etc.

In operation 440, for the particular document, a document topic embedding may be created or calculated based on a set of nearest topics to the preliminary document embedding of the document. For example, the preliminary document embedding may be compared using a distance function (e.g. cosine distance or other distance) to each of the topic embeddings determined in operation 420, and the K (where K is an integer, e.g. 3) nearest topics (e.g. those with the K lowest distances) to the preliminary document embedding may be chosen. These K nearest topics to the document may be averaged, possibly weighted for example by their similarity or distance scores, to create a document topic embedding. For example, example Equation 3 may be used:

Document topic embedding
$$TEdoc = \widetilde{Te}doc = TE_1 * CS_1 + TE_2 * CS_2 + TE_3 * CS_3 \qquad \text{Eq. 3}$$

Where TEx is the topic embedding for topic X; and CSx is the distance, e.g. the cosine similarity, between the embeddings of topic X and the preliminary document embedding. While in this example K=3, such that the K nearest topics to the preliminary call embedding are selected; other numbers of embeddings may be chosen as the top embeddings to use.

In operation 450, for each phrase in the particular document, call or interaction a topic relevancy score for the phrase relative to the document it contains may be calculated or determined based on the document topic embedding and the embedding associated with the phrase. For instance, the topic relevancy TR score for a phrase i relative to the document may be the distance between the phrase's embedding PEi and TEdoc, the embedding of the topic of the document, for example using the cosine similarity score as the distance to the topic embedding:

$$TRi = \text{cosine\_sim}(PEi, TEdoc) \qquad \text{Eq. 4}$$

Each phrase may have a topic relevancy score relative to a particular document, and thus a phrase may have a different topic relevancy score for each document in which it is contained. For example, in call transcript predominantly about billing, the phrase 'I want to pay my bill' will have a higher topic relevancy score than it would have in a call about interact connectivity problems.

In operation 460, a ranking algorithm such as a graph-based ranking algorithm may be used to determine a saliency or importance score or rating for each phrase in the particular document, the score for the phrase relative to the particular document (each phrase may have a different saliency score relative to each document). Each saliency score may be based on the topic relevancy score for the phrase, and an inverse frequency score for the phrase. For example, for a document, the phrase embeddings, SIF scores and topic relevancy score for each phrase may be input to a personalized TextRank or other algorithm, the SIF score and topic relevancy score combined to be the personalization score.

In operation 470, an embedding for the particular document may be calculated or created using or based on the saliency scores (relative to the containing document) and embeddings for the phrases in the document. For example, a document embedding may be created by determining its top-N (N being an integer) phrases, e.g, the N phrases having the highest saliency scores relative to the document may be added together with a weighted average, the weighting being the saliency score, such as in example Equation 3 below. In some cases, N may be set to be the top X percent, e.g. the top 85%, of the phrases, those having the top X % saliency scores. In other embodiments, all documents, rather than the top N documents, may be used, as the lower documents may receive a lower weighting.

Document embedding DE for document Y may be:

$$DE = PE_1 * PS_1 + PE_2 * PS_2 + PE_N * PS_N \quad \text{Eq. 5}$$

Where PEx is the phrase embedding for phrase X; PSx is the saliency or importance score for phrase X (relative to the specific document Y); and N is the number of phrases chosen as the top phrases for document Y. Psi, the saliency score of phrase i, may be obtained by the personalized TextRank algorithm on the PEs of the document, with bias (e.g. a combination of topic relevancy and SIF of a phrase) included for each phrase.

Operations 430-470 may be performed for one, all, or a number of documents. Other or diff rent operations may be used.

In operation 480, the document embedding for a particular document may be used in a practical manner, for example in search by example (e.g. a user provides call X as an example and a search process returns similar calls); clustering documents or organizing a database of calls by similarity; semantic search of documents of calls (e.g. a user enters a topic, and the document corpus is searched semantically using embeddings and meaning, rather than based on straight text matching), key-phrase extraction, topic modeling, text or call summarization (e.g. to extract user or agent notes), automated FAQs or chat-bots, etc. Embodiments may find use in semantic search of text or calls by phrase, where input phrases are used semantically (e.g. searching for 'cancel account' to return calls or call-snippets containing 'terminate service', 'suspend subscription' etc.), which could also be used in real-time to assist agents searching for similar problems.

Embodiments may use phrase embeddings based on phrases, or structured phrases, as input. A phrase may be one or more words; in some embodiments a specific type of data structure, a structured phrase, is used, but need not be. In order to produce embeddings, an embodiment may in a first stage train a model using input samples based on a set or corpus of input texts, and create, using the model, a look-up table including semantic embeddings for terms. While examples of methods to produce structured phrase embeddings are described herein, other methods may be used. The look up table may include frequency or SIP information. An embodiment may accept a document from the corpus or a new input text and use the look-up table to produce embeddings of the relevant text or document.

Embodiments may project different variations of essentially the same statement within a document onto a structured phrase, which may be a normalized (e.g. converted into a standard or unified form) form. By extracting data into structures to produce what is termed herein normalized structured phrases from a text or call transcript, and using these cohesive units, typically stripped of noise, as basic units or building blocks, embodiments may simultaneously improve embedding and solve the problems such as noise. Words may be brought together in a normalized structure regardless of the variations in the original sentence structures (e.g., "i finally paid the bill for the two months of January and February" and "i got the bill for the two months of January and February finally paid" may both be normalized to ["i", "pay", "bill" "for" "month of January and February", "finally"]). Well-defined structures used with some embodiments may have the part-of-speech of each component part known, which may allow embodiments to "mix and match" various well-formed sub-terms (e.g. 'i pay bill' 'pay finally' 'bill for month of January' etc.) and feed them to the training algorithm to ensure they all get associated with each other simultaneously (e.g. both the phrase with its sub-terms, and the sub-terms between themselves). Each sub-term may include one or more words and may be created by selecting and concatenating varying subsets of the slots of the structured phrase.

Multiple variations of the same term (e.g. having the same key lemmas, after articles, prepositions, pronouns, etc. and also word order are discounted) may be projected into fixed or pre-defined structures or frames, e.g. to produce normalized structured phrases, which can be used for training an embedding model directly as phrases, using for example the word2vec algorithm. The normalized structured phrases may form their own input window to a model. Tokens may be the individual pieces into which a text is broken for processing; a token is typically but not always a word.

A lemma for a set of words may be the canonical form, dictionary form, or citation form of a set of words (e.g. 'pays', 'paid', 'paying' all have the same lemma of 'pay'). Before being entered into structures words may be lemmatized, converted to the canonical form. Each slot in the structured phrase or frame in some embodiments has, can accept only, or is associated with a known part-of-speech.

Training and inference or use may be performed using a combined set of data or input samples derived from the same input text (e.g. conversation transcript), each set of data at a different resolution level. Inference may be the process of using a trained model to derive the relevant value (e.g. embedding) for a document in the corpus or a new item (including those not seen in the training corpus). In embodiments of the present invention, inference using a model may occur to create a table, which may in turn be used during production or inference to determine embeddings for tokens or terms.

In one embodiment three levels may be used, but other or different levels may be used. For example, a phrase level, turn level, and call level may be used, where at each of the phrase, turn and call level input samples may be created using resolution or detail levels different from the input created at the other levels. At each level the amount of text used for input to create samples may be different (e.g. at the phrase level, text from one structured phrase at a time is used, and each different phrase is used in isolation to provide input; at the turn level, text from one speaker turn at a time is used, from one or more structured phrases, and each different turn is used in isolation to provide separate input; at the call level all the text in the call, all turns, is available to produce an input), and at each level the resolution may be different. Input data to a model and also input data during inference, may be created from each of these different levels. Resolution or detail in the context of producing training samples may refer to the number of different types or coverage of samples used at each level. Each level may augment the training of the other level.

Each level or resolution may produce one or many input samples, which may be used to train a model, e.g. word2vec. After training, the resulting semantic embeddings from the model may be placed in a look-up table for production or inference time.

For example, ASR may be performed on a call or interaction to form an input text, and from this data structured phrases may be extracted. From this data, a sub-phrase batch at a phrase level may be combined with a sub-phrase batch at a turn level and a sub-phrase batch at a call level to train an embedding model using a set of input samples.

Prior to training, and/or prior to inference, a conversation, call or interaction, or other document, may be processed using different operations, for example phrase extraction (e.g. converting an original text to a structured text or call), speaker turn structuring (creating or marking a sequence of speaker turns, or the ordered sequence of structured phrases extracted from each alternating speaker turn), and sub-term creation. Not all of these operations need be used. A sub-term may be one or more words or terms. Input text may be generated for each conversation, call or interaction. A training process may include for example phrase extraction; turn structuring; sub-term creation; and training using for example an ML algorithm.

Tools such as a dependency parser and/or operating based on rules may be used to create a structured text including information identifying or grouping text into turns (e.g. who has spoken which text). The structured text may include a sequence of turns, each of which is a sequence of normalized structured phrases. After grouping text to turns, if performed, the text may be converted to structured phrases. A lexicon or term lexicon may be built by passing each structured phrase produced for the structured calls through sub-term generation, calculating or accumulating the frequencies of each token, and calculating a SW score for each token or term.

During phrase extraction, the original text or call transcript may be processed for example by a dependency parser and part-of speech-tagger (such as the spaCy natural language processing system), and then processed to restructure and simplify the text or sentences into fixed or specific grammatical frames or structures, termed herein 'normalized structured phrases'. In one embodiment, normalized structured phrases that are verb phrases and normalized structured phrases that are noun phrases may be used, but other types of phrases may be used.

Each structured phrase may include one or more, or a set of, fixed positions or slots, each position or slot associated with, corresponding to or including a part-of-speech or grammatical role. Each slot may include zero or more lemmatized tokens (e.g. words). A phrase-part may be the components of one slot of a phrase; phrase tokens may be all the tokens in the phrase. A "flattened" phrase is the set or list of the tokens within the phrase, without the structure of that phrase. A term may be a self-contained semantic unit including multiple tokens from a phrase. A sub-term may be a term whose tokens are all contained in a larger term. For example, 'new remote control' is a sub-term of "new remote control for cable box". A sub-term need not be contiguous with respect to the containing term, for example "technician to install new router today" is a sub-term of (the complete-term) "technician not able to install new router for home wifi network today". Sub-term generation may include generating all the (semantically meaningful or grammatically well-formed) sub-terms from a given structured phrase. Parts-of-speech with a phrase may be utilized for the purpose of appropriately combining the various phrase parts. A phrase part may be one of the constituents of the phrase, each phrase part corresponding to one slot; for the phrase including the following four entries in each slot: "new", "remote control", "for", and "cable box" each of these four is one of the four 4 'parts' of the phrase. Phrase terms may include all the tokens, sub-terms and the complete term extracted from a structured phrase through the process of sub-term generation, A complete term may be the concatenation of all parts of a phrase into a single term.

A structured verb phrase may include the following example fixed parts; other fixed parts may be used. If an embodiment uses fixed parts, not all of which need be present or filled for each sentence or text sequence, e.g. some entries may be required and others optional, thus structured phrases of the same type may each have certain entries or slots blank, such that which entries are blank differ between filled-in structured phrases. An example of the structure of a structured verb phrase is:

[subject]
[negative]
[aux] (e.g. want to, need to)
verb
[object]
[preposition]
[prepositional-object]
[adverb]

In the structured phrase depiction above and below, slots described by [bracketed] parts of speech are optional, and non-bracketed parts of speech describe compulsory or mandatory slots, where the structured phrase requires an entry.

A structured noun phrase or other structured phrases may include different fixed parts, e.g. preposition, adjective, noun, etc. An example of a noun phrase is on|first|day-|of|next|month.

If the text is a multi-party conversation, the text, e.g. a call, may be hierarchically decomposed into a sequence of speaker 'turns' (e.g. agent turns and customer turns in a two-party agent-customer conversation), and each turn may be converted into a sequence of structured (e.g. verb, noun or other) phrases.

Sub-terms may be generated or extracted from each single structured phrase during the processing of an input text. Since the parts-of-speech of the different slots, positions or entries in the structured phrase is typically known, a process may extract grammatically well-formed sub-terms from the structured phrase, e.g. by using the contents of selected sub-set of combinations of slots from each phrase such as subject+verb, verb+object, verb+preposition+prepositional-object. For example, from the single structured phrase, which includes parts of speech in parentheses associated with each slot: I (subject)|not (negative)|pay (verb)|invoice (object)|for (preposition)|last month (preposition object), the following example normalized sub-terms may be generated, and associated with the structured phrase (the following is a partial list of possible sub-terms):

Pay
I pay
Not pay
I not pay
Invoice
Pay invoice

Typically, each slot or position in the set of slots in the structured phrase can accept and is associated with only a certain part of speech. A part of speech may be a category of words or lexical items that have similar grammatical properties. Parts-of-speech may include, for example, noun, verb, adjective, adverb, pronoun, preposition, conjunction, connector, negative, aux, interjection, numeral, and article, but other parts-of-speech may be used.

After a document, call, interaction, etc. is processed, training input samples may be constructed or extracted from the resulting hierarchical structure of the input text or calls to be inputs to the embedding (e.g. word2vec) training. The input samples may be constructed at overlapping or combined levels of resolution. Each of the several inputs that are created, e.g. tokens, multi-word parts, etc., may be used separately to train the text or phrase embedding model.

At the phrase level, multiple sets of data may be created or extracted, each from one structured phrase without considering as input text surrounding that phrase, for example a) individual phrases, e.g. the entirety of the phrase; b) "sub-parts", preserving multi-word parts, or all the words within a slot in a phrase (e.g. phrases that commonly include more than one word, such was last month) but producing a sample with less than all words in a phrase; and c) token and sub-term combinations (e.g. multi-word combinations which across slots in a phrase but which are not the entire phrase, such as "not afford high prices"), typically with less than all words in a phrase. Other or different data may be created or extracted at the phrase level. At the phrase level, the original call or text is viewed as a flat sequence of structured phrases, and each phrase encountered is viewed as an independent unit of text (e.g. disconnected from the other phrases in the call and even from those in the same speaker turn), from which training samples may be created in three ways. In other embodiments other numbers and types of data categories may be created at the phrase level.

At the token level at the phrase category, each structured phrase may be 'flattened' out into a sequence of its individual tokens (e.g. words). Flattening refers to whether a training sample includes single words—flattened—or whether it retains the multi-word terms from the structured phrase not flattened. This sequence of phrase tokens may become a single training sample for the embedding (e.g., word2vec) algorithm, with a single context window spanning the entire sample. For example, if a certain phrase is I|not|pay|invoice|for|last month, which forms its own natural cohesive window, the set of tokens extracted may be "I", "not", "pay", "invoice" "for", "last" and "month".

At the multi-word parts at the phrase category, an embodiment may train multi-word terms directly into the embedding model. This may make use of this aspect of the structured phrase, where a slot may contain a multi-word term serving a well-defined function (e.g. subject, object etc.) within the overall phrase e.g. 'cable tv service' or 'channel selection'. For example, if a certain phrase is I|not|pay|invoice|for|last month, the set of tokens extracted may be "I", "not", "pay", "invoice" "for", and "last month": "last month" is preserved as "last month" instead of being broken into tokens "last" and "month". Each phrase is treated as a complete text, a single context window is used which spans it completely, but now, instead of flattening it into individual tokens, a process preserves each part or slot as-is. This way, a process constructs training samples containing multi-word terms (not necessarily only multi-word terms, since some slots may contain single tokens) and these terms may be associated with their surrounding terms and/or tokens during the training process, thereby producing embeddings for these terms directly. For example, in the structured phrase "I|cancel|subscription|to|cable TV service" the term 'cable tv service' may be associated with its contextually related tokens 'subscription' and 'cancel'. At the token and sub-term combinations level at the phrase category, the technique of 'sub-term extraction' may be used to generate all possible tokens and terms from a single structured phrase.

Embodiments may also create training and inference input samples at the speaker turn and call resolutions, where there is a tradeoff of some precision for a broader and richer context. Turn level resolution input samples may use a different level of resolution than at the phrase level; turn or call level resolution may use a sliding window for input to a training or inference process. Each level may address a different precision/recall tradeoff proportion. At the call and turn resolution levels there may no longer be a natural context window as with the phrase level, so these levels may need to employ a regular sliding context window, but also still able to use the structured nature of the phrases in the sequence to construct multiple training samples from the same text, processing the text in certain manners.

In some embodiments, at the turn level, turn input samples may be created including only input from a single turn from a source text, samples being formed by removing structure from structured phrases. At the call level, call input samples may be created from the input text, each call input sample comprising input from more than one turn within the text. At the turn level, one input sample may include text from multiple phrases within a turn, in contrast with the phrase level. A sliding window of a certain size (e.g. 10-15 individual input items such as tokens; other sizes may be used) may be applied to the call level input and if needed turn level input to provide input to the model. At the call level, one input sample may include text from multiple turns, and multiple phrases, in contrast with the turn and phrase levels.

At the turn or speaker-turn level, the set of words used for one sample is not limited to one phrase, and a number of different samples may be created using more than one phrase at the token level by, for each term (with the samples for each turn limited to the text of that turn) flattening structured phrases, samples with multi-word parts of the phrase preserved; phrase parts; and speaker-turn level terms, a sequence of all the tokens, terms and sub-terms obtained by the process of sub-term generation on each of the structured phrases in a given speaker turn. At the turn level, the model may be trained with inter-phrase relationships, as each sample may be created from more than one phrase within a turn.

At the call level, the set of words is not limited to a phrase or to a turn, and a number of different samples may be created using more than one phrase including, as one example, tokens (e.g. an ordered sequence of all the tokens from all the flattened structured phrases of all turns in the sequence of speaker turns of the given call; the ordered sequence of all the tokens contained in the call); and phrase parts (e.g. an ordered sequence of all the phrase-parts of all the structured phrases of all the speaker turns in a given structured call; the ordered sequence of all the phrase-parts contained in the call). The resulting samples may be fed to a model using a sliding window. At the call level, the model may be trained with inter-turn relationships, as each sample may be created from text from more than one turn.

Resolution or detail may differ among levels in different ways. For example, 'complete-terms' (the concatenation of all parts of a phrase into a single term) may be used only at the call level, may differ from input using '(all) terms' (including all possible sub-terms) which may not be generated at the call level, but rather in one embodiment only at the phrase and turn levels. Phrase and term "turn" input may differ in that the unimportant tokens may be omitted from the turn level. Term input at the turn level may include "all" terms, a sequence of all the tokens, terms and sub-terms obtained by the process of sub-term generation on each of the structured phrases in a given speaker turn; possibly with selected non-important terms (e.g. a pre-defined list) omitted at the turn level. 'Important' may be in the semantic sense (e.g. topic relevancy or even based on a SIF or TF-IDF (term frequency-inverse document frequency) based measure). Important may be a measure of important/unimportant parts-of-speech, as labelled in each slot of the structured phrase In addition to defining samples using categories such as phrases and sub-parts, other differences may exist when creating samples at different resolution levels. For example, at the turn level, the terms may be trimmed, so that all non-essential tokens (pronouns, auxiliary-verbs) are discarded, leaving a more compressed training sample.

Likewise, at the an embodiment may not perform generation of 'sub-terms' at all, and training samples may be based only on single-tokens, original multi-word parts, and fully-joined phrases. While phrase, turn and call levels are used as examples, other resolutions and other numbers of resolutions and levels may be used.

After training samples are developed at various levels and resolutions, e.g. phrase, turn and call levels (other levels may be used, and not each of phrase, turn and call levels need be used), the input samples may be used to train an embedding model. An algorithm such as word2vec may generate an embedding model by iterating over each training sample in the training set and learning to associate neighboring elements as being semantically related.

While during training the model may be a NN, after training the outputs for each input item from the model may be placed in a look-up table such that the model is structured as a look-up table, allowing looking up a word or phrase as in a dictionary. Such a table may include terms and sub-terms as look-up entries or index entries, and for each entry an embedding (a vector or series of numbers), and a SIF score or other frequency measure.

Performing inference to find a word embedding, may be using a look-up table filled in using inference, where the input text for which embedding is desired is first processed to produce a number of sub-terms, each sub-term including one or more words, and applying each sub-term to, or looking up an embedding corresponding to each sub-term in, an embedding model (e.g. as embodied in a look up table) to produce for the sub-term an associated embedding. The sub-terms may be generated from structured phrases as discussed elsewhere herein, and thus the input may be converted to one or more structured phrases as an initial step of processing of the input text.

For a phrase occurring within the input text, an embodiment may produce an embedding based on a weighted combination of the sub-terms within the phrase, each weight being based on a SIF measure or other weight for the sub-term associated with the weight. In some embodiments at the inference stage, input from a newly seen (e.g. not used for training) input text may be processed into structured phrase(s) as discussed herein, and then for each or for a certain set of structured phrases, for each phrase, sub-terms may be created, and an embedding using the trained phrase embedding model may be determined for the phrase, e.g. using a look-up table, based on the sub-terms.

Embodiments may improve on prior NLP, semantic and other technology by providing more accurate and meaningful document embeddings, which in turn may allow for more accurate and meaningful analysis of documents, e.g. improved searching over the documents, improved grouping or categorization of the documents, etc.

Embedding module 52 may be, or may be implemented using, a NN, an information processing paradigm that may include nodes, referred to as neurons, organized into layers, with links between the neurons. The links may transfer signals between neurons and may be associated with weights. Typically, the neurons and links within a NN are "virtual" and are represented by mathematical constructs, such as activation functions and matrices of data elements and weights. A processor, e.g. CPUs or graphics processing units (GPUs), or a dedicated hardware device may perform the relevant calculations. In some embodiments, vectors are calculated two ways: directly from text in a source (e.g. creating phrase vectors based on the text in the phrase) or from other vectors (e.g. creating query vectors based on phrase vectors), and the direct calculation may in some embodiments be via a neural network.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A system for determining an embedding for a document comprising:
   a memory; and
   a computer processor configured to:
   create a plurality of topics for a corpus of documents, wherein the topics are created by clustering a set of phrases of the corpus into clusters;
   determine for the document a preliminary document embedding, wherein the document is not included in the corpus;
   determine a set of nearest topics to the preliminary document embedding, the determining of a set of nearest topics comprising calculating similarity scores between the preliminary document embedding and one or more of the topics;
   determine for the document a document topic embedding based on the set of nearest topics to the preliminary document embedding;
   determine for each phrase in the document a topic relevancy score based on the document topic embedding and a phrase embedding associated with the phrase;
   use a ranking algorithm to determine a saliency score for each phrase in the document, each saliency score based on the topic relevancy score for the phrase, and an inverse frequency score for the phrase;
calculate a document embedding for the document using the saliency scores and phrase embeddings for the phrases in the document; and
use the embedding for the document in an automated chat-bot.

2. The system of claim 1 wherein the topics are created by determining a topic embedding for each cluster.

3. The system of claim 1 wherein each phrase is a structured phrase comprising a set of slots, each slot associated with a part-of-speech.

4. The system of claim 1 wherein the document is a transcript of a conversation.

5. The system of claim 1 wherein each embedding comprises a vector indicating a semantic measure.

6. The system of claim 1 wherein the ranking algorithm uses a graph comprising nodes, each node corresponding to a phrase.

7. The system of claim 1 where the document embedding comprises a vector, the topic embedding comprises a vector, and each embedding for a phrases in the document comprises a vector.

8. A method for determining an embedding for a document, the method comprising, using one or more computer processors:
creating a plurality of topics for a corpus of documents, wherein the topics are created by clustering a set of structured phrases of the corpus into clusters;
determining for the document a first document embedding, wherein the document is not included in the corpus;
determining a set of nearest topics to the first document embedding, the determining of a set of nearest topics comprising calculating similarity scores between the preliminary document embedding and one or more of the topics
determining for the document a document topic embedding based on the first document embedding and the set of nearest topics;
determining for each structured phrase in the document a topic score based on the document topic embedding and the structured phrase;
using a graph-based algorithm to determine a saliency score for each structured phrase in the document, each saliency score based on the topic score for the structured phrase;
calculating a document embedding for the document using the saliency scores and structured phrase embeddings for structured phrases in the document; and
using the embedding for the document in an automated chat-bot.

9. The method of claim 8 wherein the topics are created by determining a topic embedding for each cluster.

10. The method of claim 8 wherein each structured phrase comprises a set of slots, each slot associated with a part-of-speech.

11. The method of claim 8 wherein the document is a transcript of a conversation.

12. The method of claim 8 wherein each embedding comprises a vector indicating a semantic measure.

13. The method of claim 8 wherein the graph-based algorithm is a ranking algorithm, wherein each node corresponds to a phrase.

14. A method for determining an embedding for a document, the method comprising, using one or more computer processors:
creating a plurality of topics for a corpus of documents, wherein the topics are created by clustering a set of phrases of the corpus into clusters;
determining for the document a preliminary document embedding, wherein the document is not included in the corpus;
determining a set of nearest topics to the preliminary document embedding, the determining of a set of nearest topics comprising calculating similarity scores between the preliminary document embedding and one or more of the topics;
determining for the document a document topic embedding based on the set of nearest topics to the preliminary document embedding;
determining for each phrase in the document a topic relevancy score based on the document topic embedding and a phrase embedding associated with the phrase;
using a ranking algorithm to determine a saliency score for each phrase in the document, each saliency score based on the topic relevancy score for the phrase, and an inverse frequency score for the phrase;
calculating a document embedding for the document using the saliency scores and phrase embeddings for the phrases in the document; and
using the embedding for the document in an automated chat-bot.

15. The method of claim 14 wherein the topics are created by determining a topic embedding for each cluster.

16. The method of claim 14 wherein each phrase is a structured phrase comprising a set of slots, each slot associated with a part-of-speech.

17. The method of claim 14 wherein the document is a transcript of a conversation.

18. The method of claim 14 where the document embedding comprises a vector, the topic embedding comprises a vector, and each embedding for a phrase in the document comprises a vector.

19. The method of claim 14 wherein each embedding comprises a vector indicating a semantic measure.

20. The method of claim 14 wherein the ranking algorithm uses a graph comprising nodes, each node corresponding to a phrase.

21. The method of claim 14 comprising converting each phrase in the document to a structured phrase by, for a phrase, placing words in the phrase into a normalized structure, and wherein the phrase embedding for a phrase is the structured phrase embedding for the structured phrase corresponding to the phrase.

22. The method of claim 14 wherein the ranking algorithm is a graph-rank algorithm biased by the inverse frequency score for phrases.

23. The method of claim 14 wherein the preliminary document embedding is calculated using a weighted average of phrases using a set of weights, each weight corresponding to a phrase and based on the position of the phrase in in the document.

24. The method of claim 14 comprising converting a plurality of recordings to text files to create the corpus of documents.

25. The method of claim 14 comprising training an embedding model using a plurality of levels, each level using an amount of text different from the input created at the other levels.

26. The method of claim 14 comprising using the embedding for the document in a search.

27. The method of claim 14 comprising using the embedding for the document in a semantic search.

28. The method of claim 14 comprising using the embedding for the document in clustering a plurality of documents.

29. The method of claim 14 comprising using the embedding for the document in key phrase extraction.

30. The method of claim 14 comprising using the embedding for the document in topic modelling.

31. The method of claim 14 comprising using the embedding for the document in text summarization.

* * * * *